(12) United States Patent
Tom

(10) Patent No.: US 8,681,131 B2
(45) Date of Patent: Mar. 25, 2014

(54) METHOD AND APPARATUS FOR AN ELECTRONIC DEVICE ASSEMBLY

(75) Inventor: Travis Tom, Newbury Park, CA (US)

(73) Assignee: Nokia Corporation, Espoo (FI)

( * ) Notice: Subject to any disclaimer, the term of this patent is extended or adjusted under 35 U.S.C. 154(b) by 1042 days.

(21) Appl. No.: 12/493,812

(22) Filed: Jun. 29, 2009

(65) Prior Publication Data

US 2010/0328273 A1    Dec. 30, 2010

(51) Int. Cl.
*G06F 3/033* (2013.01)
(52) U.S. Cl.
USPC .......................................... 345/184; 345/169
(58) Field of Classification Search
USPC .................. 345/156–184; 455/550, 555–557, 455/575.1–575.4
See application file for complete search history.

(56) References Cited

U.S. PATENT DOCUMENTS

| | | | | |
|---|---|---|---|---|
| 6,434,404 | B1 * | 8/2002 | Claxton et al. | 455/575.3 |
| 7,085,375 | B2 * | 8/2006 | Katoh | 379/433.13 |
| 7,480,379 | B2 * | 1/2009 | Yoshikawa | 379/433.06 |
| 2001/0016508 | A1 * | 8/2001 | Kido et al. | 455/575 |
| 2002/0086698 | A1 * | 7/2002 | Sawada et al. | 455/550 |
| 2006/0100003 | A1 | 5/2006 | Kohri et al. | |

FOREIGN PATENT DOCUMENTS

| | | |
|---|---|---|
| EP | 1583330 A2 | 10/2005 |
| EP | 1780994 A2 | 5/2007 |
| JP | 2003333139 A | 11/2003 |

OTHER PUBLICATIONS

International Search Report and Written Opinion, received in corresponding Patent Cooperation Treaty Application No. PCT/IB2010/001585, Dated Oct. 1, 2010, 21 pages.

* cited by examiner

*Primary Examiner* — Vijay Shankar
(74) *Attorney, Agent, or Firm* — Harrington & Smith

(57) ABSTRACT

An apparatus comprises an assembly adapted to rotatably couple a first housing and a second housing, the assembly adapted to rotate the first housing and the second housing with respect to each other between a closed configuration and at least one open configuration, the assembly comprising an inner ring coupled with the first housing and an outer ring coupled with the second housing, the inner ring slidably coupled with the outer ring in a circumferential direction, the outer ring movable through a first opening in the first housing, the inner ring movable through a second opening in the second housing when the first housing and the second housing rotate with respect to each other.

19 Claims, 7 Drawing Sheets

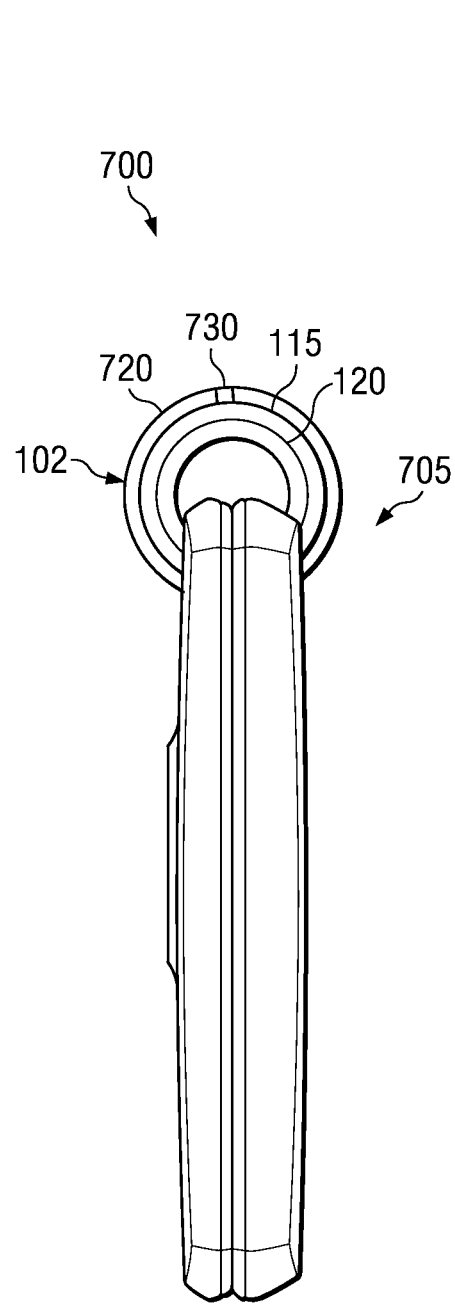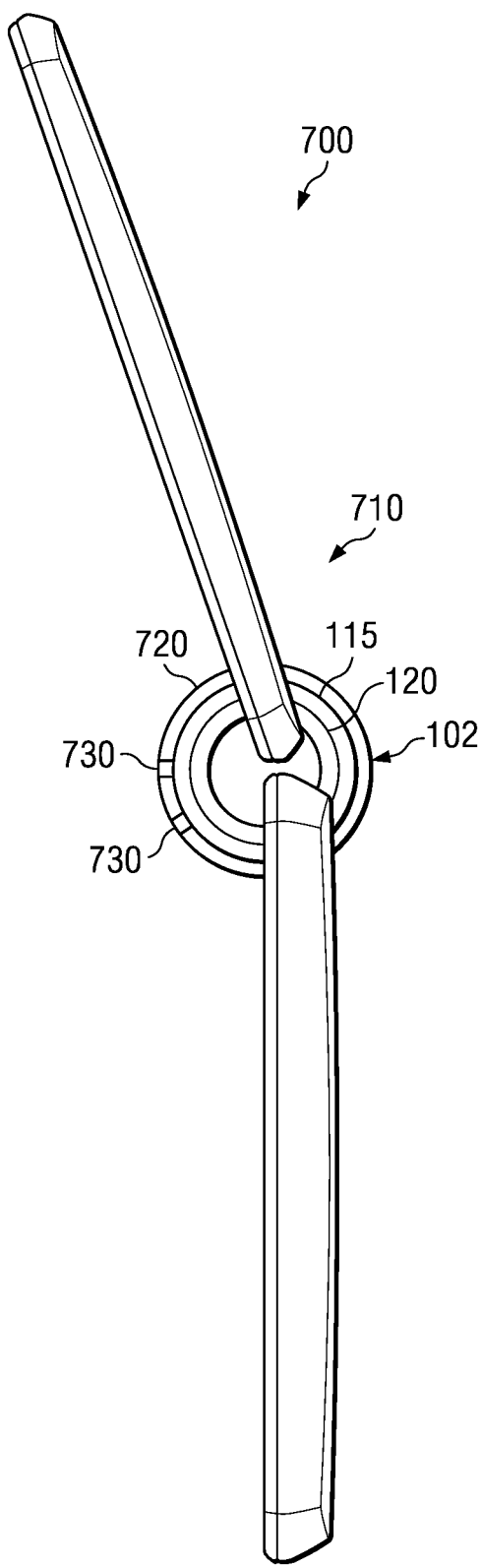
FIG. 7A
FIG. 7B

United States Patent — US 8,681,131 B2

METHOD AND APPARATUS FOR AN ELECTRONIC DEVICE ASSEMBLY

TECHNICAL FIELD

The present application relates generally to an assembly for an electronic device.

BACKGROUND

Electronic devices such as a laptop computer, a personal digital assistant (PDA), or a mobile phone may generally comprise two portions, a top housing and a bottom housing, which are coupled with one or more hinges. One or more conventional hinges may be used to rotatably couple the top and bottom housings of the electronic device. Electronic devices with top and bottom housings connected by one or more conventional hinges may have a closed configuration and an open configuration.

SUMMARY

Various aspects of examples of the invention are set out in the claims.

According to a first aspect of the present invention, an apparatus comprises an assembly adapted to rotatably couple a first housing and a second housing, the assembly adapted to rotate the first housing and the second housing with respect to each other between a closed configuration and at least one open configuration, the assembly comprising an inner ring coupled with the first housing and an outer ring coupled with the second housing, the inner ring being slidably coupled with the outer ring in a circumferential direction, the outer ring movable through a first opening in the first housing, the inner ring movable through a second opening in the second housing when the first housing and the second housing rotate with respect to each other.

According to a second aspect of the present invention, a method comprises rotating a control wheel on an electronic device such that when the electronic device is in a closed configuration, the rotating of the control wheel affects a first display on a top surface of a housing and when the electronic device is in an open configuration, the rotating of the control wheel affects a second display on a bottom surface of said housing.

According to a third aspect of the present invention, a method comprises rotating a control wheel on an electronic device such that when the electronic device is in a closed configuration, the rotating of the control wheel affects a first display on a top surface of a first housing and when the electronic device is in an open configuration, the rotating of the control wheel affects a second display on a second housing.

BRIEF DESCRIPTION OF THE DRAWINGS

For a more complete understanding of example embodiments of the present invention, reference is now made to the following descriptions taken in connection with the accompanying drawings in which:

FIG. 7A is a diagram of a side view of an apparatus with an assembly shown in a closed configuration according to another example embodiment of the invention;

FIG. 7B is a diagram of a side view of the apparatus of FIG. 7A with an assembly shown in an open configuration according to another example embodiment of the invention;

DETAILED DESCRIPTION OF THE DRAWINGS

An example embodiment of the present invention and its potential advantages are understood by referring to FIGS. 1A through 10 of the drawings.

Figure 1A:
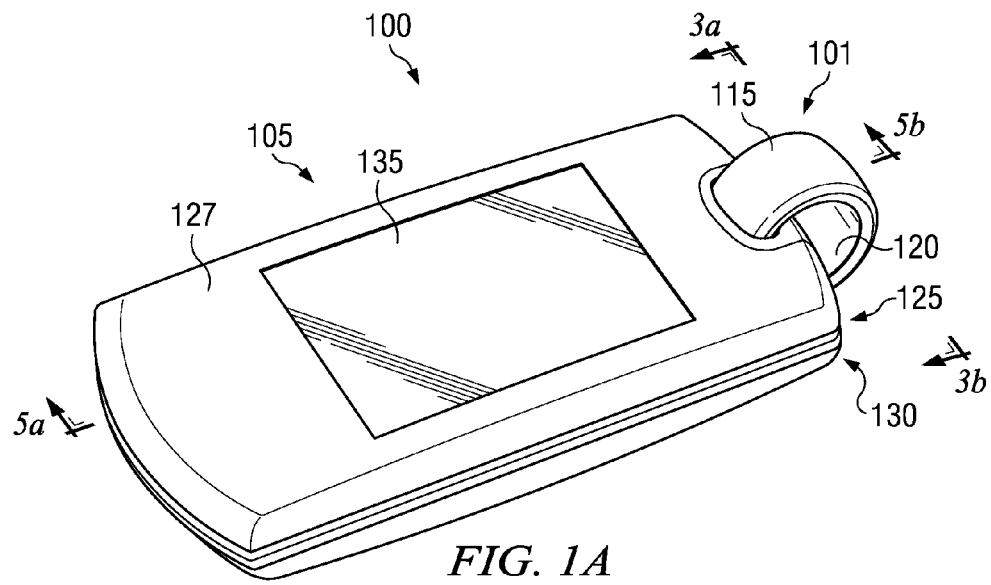
FIG. 1A is a diagram of an apparatus with an assembly shown in a closed configuration according to an example embodiment of the invention.
Figure 1B:
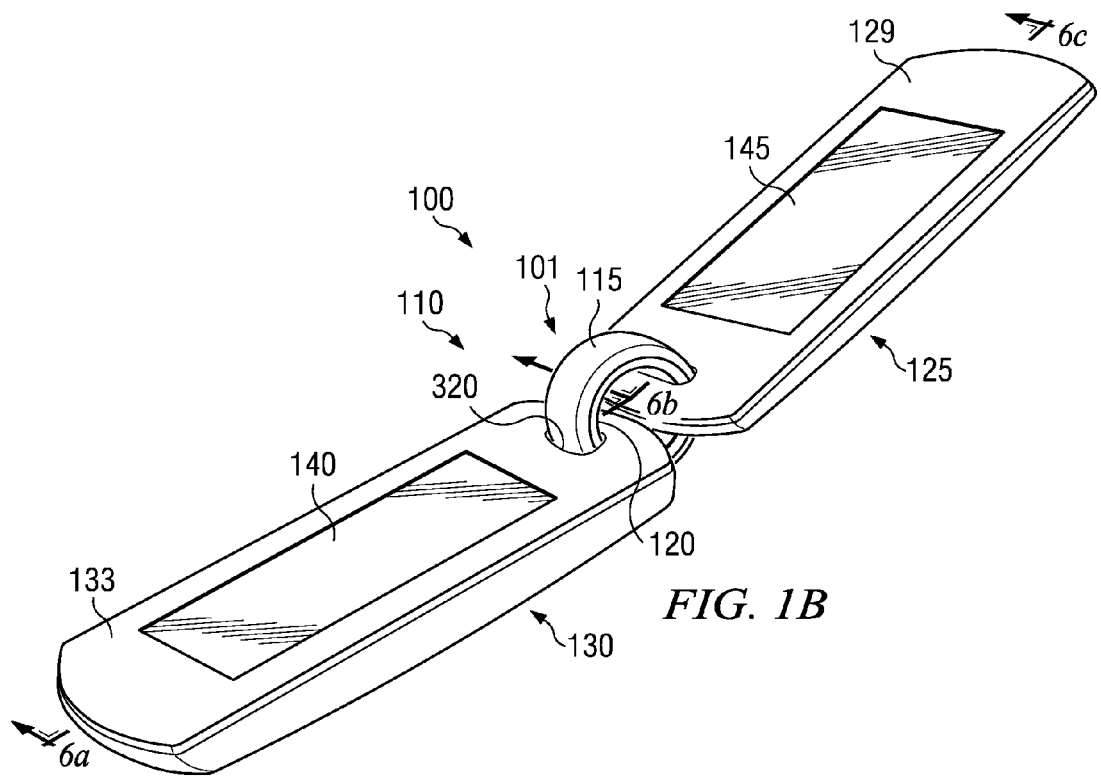
FIG. 1B is a diagram of the apparatus of FIG. 1A with the assembly shown in an open configuration according to an example embodiment of the invention.
Figure 4:
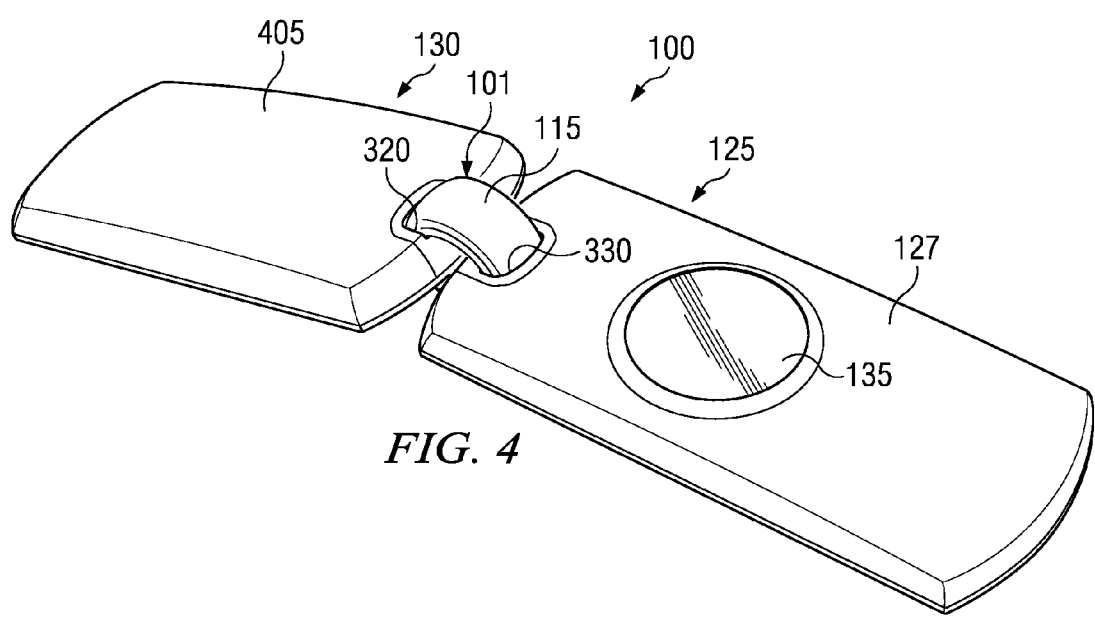
FIG. 4 is a diagram of a top view of the apparatus of FIG. 1B according to an example embodiment of the invention.

FIG. 1A is a diagram of an apparatus 100 with an assembly 101 shown in a closed configuration 105 according to an example embodiment of the invention. FIG. 1B is a diagram of the apparatus 100 of FIG. 1A with assembly 101 shown in an open configuration 110 according to an example embodiment of the invention. Apparatus 100 is a mobile electronic device; however, apparatus 100 may be any electronic device including but not limited to a laptop computer, PDA, mobile phone, a GPS (Global Positioning Service) receiver, and/or the like. Apparatus 100 comprises a first housing 125 and a second housing 130 coupled with assembly 101. Assembly 101 comprises an outer ring 115 slidably coupled in a circumferential direction with an inner ring 120. Inner ring 120 is coupled with second housing 130 and outer ring 115 is coupled with first housing 125. In an alternative embodiment, inner ring 120 may be coupled with first housing 125 and outer ring 115 may be coupled with second housing 130. First housing 125 has two opposing surfaces, for example, a top surface 127 and a bottom surface 129. Second housing 130 has two opposing surfaces, for example, a top surface 133 and a bottom surface 405 (FIG. 4).

Figure 2A:
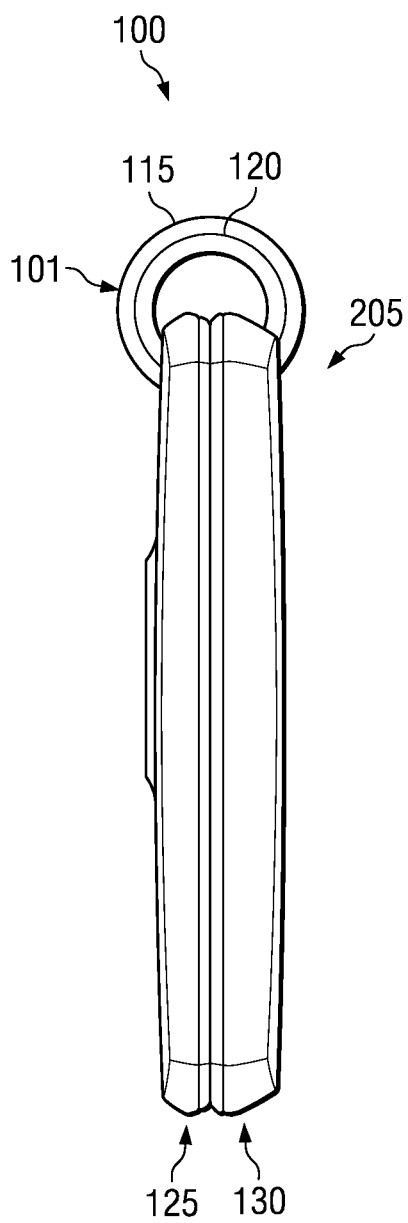
FIG. 2A is a diagram of a side view of the apparatus of FIG. 1A with the assembly shown in an closed configuration according to an example embodiment of the invention.
Figure 2B:
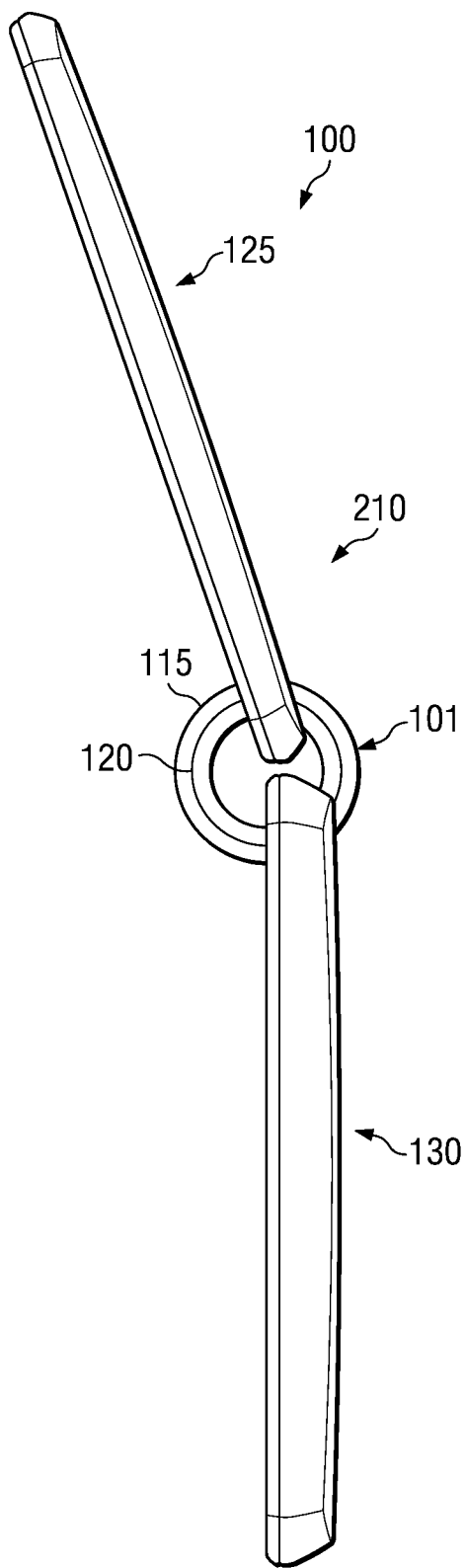
FIG. 2B is a diagram of a side view of the apparatus of FIG. 1B with the assembly shown in an open configuration according to an example embodiment of the invention.

FIG. 2A is a diagram of a side view of apparatus 100 of FIG. 1A with the assembly shown in a closed configuration 205 according to an example embodiment of the invention. FIG. 2B is a diagram of a side view of apparatus 100 of FIG. 1B with the assembly shown in an open configuration 210 according to an example embodiment of the invention. Assembly 100 is adapted to allow rotation of first housing 125 and second housing 130 with respect to each other around axis 3a-3b (FIG. 1A), which is through the center of both inner ring 120 and outer ring 115. The rotation of first housing 125 and second housing 130 may be between open configuration 210 and closed configuration 205. The diameters of inner ring 120 and outer ring 115 may be of any size. However, the diameter of each ring should be large enough to allow first housing 125 and second housing 130 to rotate freely with respect to each other.

Figure 3:
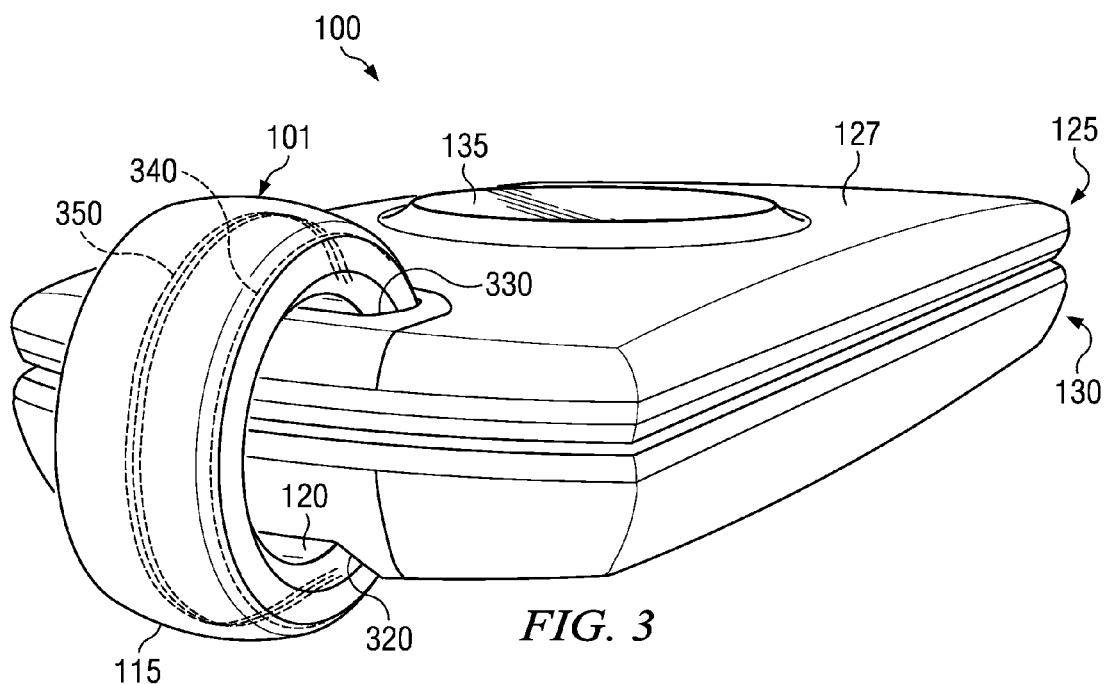
FIG. 3 is an isometric view showing the top and side of the apparatus of FIG. 1A.

FIG. 3 is an isometric view showing the top and side of apparatus 100 of FIG. 1A. First housing 125 has an opening 330 from top surface 127 through to bottom surface 129 (FIG. 1B). Second housing 130 has an opening 320 from top surface 133 (FIG. 1B) through to bottom surface 405 (FIG. 4).

In an example embodiment, a wiring harness 350, which may comprise at least one wire, may be located between the inner ring 120 and the outer ring 115. Wiring harness 350 may couple one or more electronic components located in first housing 125 and/or in second housing 130. Inner ring 120 may comprise at least one guide groove on an external surface extending in a circumferential direction and/or outer ring 115 may comprise at least one guide groove on an internal surface in a circumferential direction to help stabilize the rotation of first housing 125 and second housing 130 with respect to each other.

FIG. 4 is a diagram of a top view of apparatus 100 of FIG. 1B according to an example embodiment of the invention. FIG. 4 illustrates apparatus 100 comprising first housing 125 having bottom surface 405, second housing 130 having top surface 127 and outer ring 115. FIG. 4 further illustrates opening 330 in first housing 125 as seen from top surface 127 and opening 320 in second housing 130 as seen from bottom surface 405.

Figure 5:
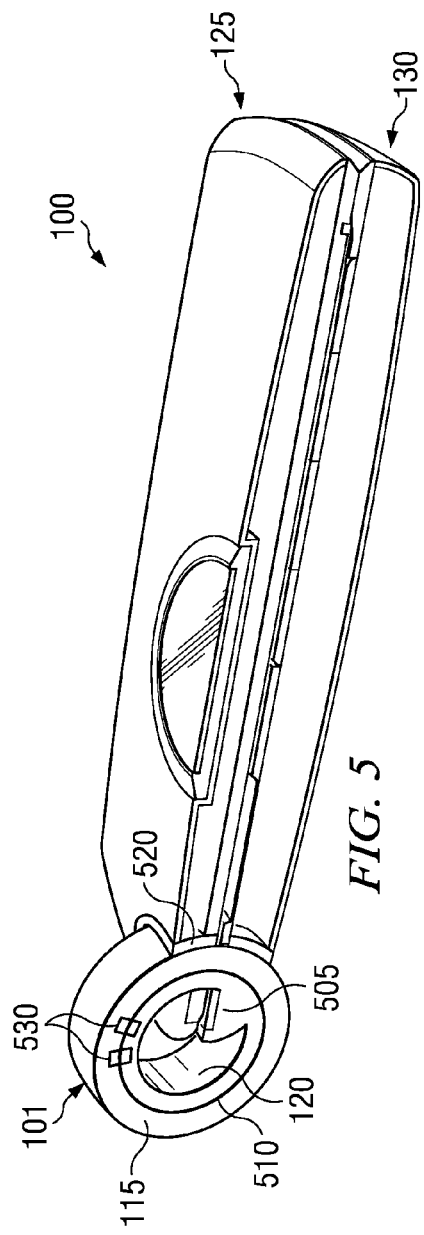
FIG. 5 is a diagram of a cross sectional view along line 5a-5b of the apparatus of FIG. 1A according to an example embodiment of the invention.
Figure 6:
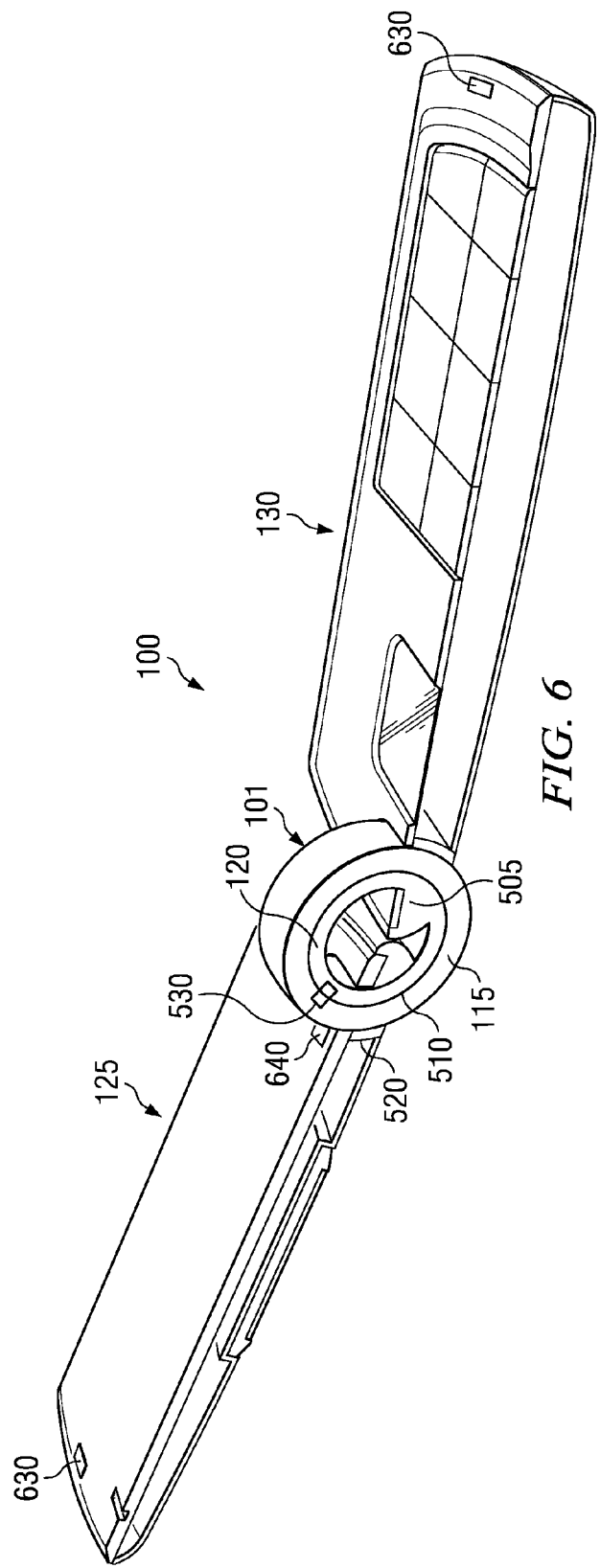
FIG. 6 is a diagram of a cross sectional view along line 6a-6b and line 6b-6c of the apparatus of FIG. 1B according to an example embodiment of the invention.

FIG. 5 is a diagram of a cross sectional view along line 5a-5b of apparatus 100 of FIG. 1A according to an example embodiment of the invention. FIG. 6 is a diagram of a cross sectional view along line 6a-6b and line 6b-6c of apparatus 100 of FIG. 1B according to an example embodiment of the invention. Assembly 101 shows outer ring 115 slidably coupled in a circumferential direction with inner ring 120. Inner ring 120 is coupled with second housing 130 at coupling point 505 and outer ring 115 is coupled with first housing 125 at coupling point 520. However, inner ring 120 may couple second housing 130 at any point and outer ring 115 may couple first housing 125 at any point, which allows first housing 125 and second housing 130 to rotate freely with respect to each other. In an alternative embodiment, inner ring 120 and second housing 130 and, likewise, outer ring 115 and first housing 125 may be manufactured as single piece of solid material, such as a single piece molded plastic, metal, ceramic and/or the like.

In an example embodiment, opening 330 (FIG. 3 and FIG. 4) in first housing 125 enables inner ring 120 to move through first housing 125 when first housing 125 and second housing 130 rotate with respect to each other. Opening 320 (FIG. 3 and FIG. 4) in second housing enables outer ring 115 to move through second housing 130 when first housing 125 and second housing 130 rotate with respect to each other. In an example embodiment, a lubricant may be disposed between an external surface of inner ring 120 and an internal surface of outer ring 115. Further, a lubricant may be used in opening 330 and in opening 320 to reduce friction between the inner and outer ring pair and the housings.

In an example embodiment, more than one inner and outer ring pairs may be coupled with first housing 125 and second housing 130 if the dimensions of the housings and the ring pairs allow. Further, each inner ring may be coupled with second housing 130 and each outer ring may be coupled with first housing 125 allowing the first and second housings to rotate with respect to each other. Coupling more than one ring pairs with first housing 125 and second housing 130 may allow greater stability and reliability of assembly 100 when the housings are rotated with respect to each other.

In an example embodiment, a biasing or stopping mechanism such as magnetic mechanism 530 (FIGS. 5 and 6) may be adapted to bias first housing 125 and second housing 130 in one or more open configurations or stop first housing 125 and second housing 130 from rotating beyond a desired angle. A biasing or stopping mechanism may comprise one or more magnetic elements coupled with the outer surface of inner ring 120 and/or the inner surface of outer ring 115, first housing 125 and/or second housing 130. Further, a biasing mechanism such as a magnetic mechanism 630 (FIG. 6) may be adapted to bias first housing 125 and second housing 130 in a closed configuration.

In an example embodiment, first housing 125 further comprises sensor 640 (FIG. 6) configured to detect assembly 100 in closed configuration 105 (FIG. 1A) and/or in at least one open configuration, such as open configuration 110 (FIG. 1B). FIG. 6 shows sensor 640 affixed to first housing 125 adjacent to control wheel 720, however, sensor 640 may be located anywhere on apparatus 100 to accurately determine whether apparatus 100 is in closed configuration 105 or an open configuration 110.

Figure 8:
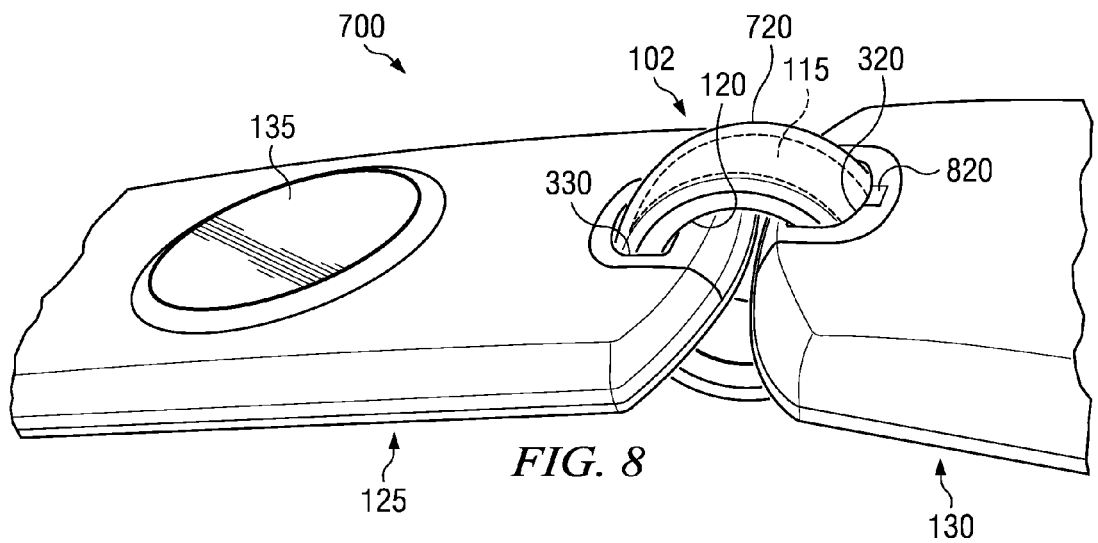
FIG. 8 is an isometric view showing the top and side of the apparatus of FIG. 7B according to an example embodiment of the invention.

FIG. 7A is a diagram of a side view of an apparatus 700 with an assembly 102 shown in a closed configuration according to another example embodiment of the invention. FIG. 7B is a diagram of a side view of the apparatus 700 of FIG. 7A with an assembly 102 shown in an open configuration according to another example embodiment of the invention. FIG. 8 is an isometric view showing the top and side of the apparatus of FIG. 7B according to an example embodiment of the invention. Referring to FIGS. 7A, 7B and 8, apparatus 700 comprises a first housing 125 (FIG. 8), a second housing 130 (FIG. 8), an inner ring 120 slidably coupled in a circumferential direction with an outer ring 115 as shown as a dotted line in FIG. 8. Assembly 102 comprises a control wheel 720, an outer ring 115 and an inner ring 120. Control wheel 720 is slidably coupled with outer ring 115 in a circumferential direction. Inner ring 120 is coupled with second housing 130 and outer ring 115 is coupled with first housing 125 allowing the housings to rotate with respect to each other. Control wheel 720 is slidably coupled with an external surface of outer ring 115. Control wheel 720 is adapted to be rotated by a user around outer ring 115 in either direction without affecting the rotation of inner ring 120, outer ring 115, first housing 125 or second housing 130. Control wheel 720 may be rotated by a user 360 degrees in either direction with respect to outer ring 115. Further, control wheel 720 may be rotated by a user without causing rotation of outer ring 115.

In an example embodiment, assembly 102 is adapted to allow rotation of first housing 125 and second housing 130 with respect to each other around an axis, which is through the center of inner ring 120, outer ring 115 and control wheel 720 and perpendicular to the rings and the control wheel. The diameters of inner ring 120, outer ring 115 and control wheel 720 may be of any size, however, the diameters of each ring and control wheel 720 should be large enough to allow first housing 125 and second housing 130 to rotate freely with respect to each other. Opening 330 (FIG. 8) in first housing 125 enables inner ring 120 and control wheel 720 to pass through first housing 125 when first housing 125 and second housing 130 rotate with respect to each other. Opening 320 in second housing enables outer ring 115 and control wheel 720 to pass through second housing 130 when first housing 125 and second housing 130 rotate with respect to each other. In an example embodiment, a lubricant may be disposed between an external surface of outer ring 115 and an internal surface of control wheel 720. Further, a lubricant may be used in opening 330 and in opening 320 to reduce friction between the inner and outer ring pair, control wheel 720 and the housings.

In an example embodiment, a biasing mechanism such as magnetic mechanism 730 (FIG. 7B) may be used to bias control wheel 720 in one or more positions. Control wheel may be biasable using magnetic mechanism 730, which may comprise one or more magnetic elements coupled with control wheel 720, outer ring 115, first housing 125 and/or second housing.

Figure 9:
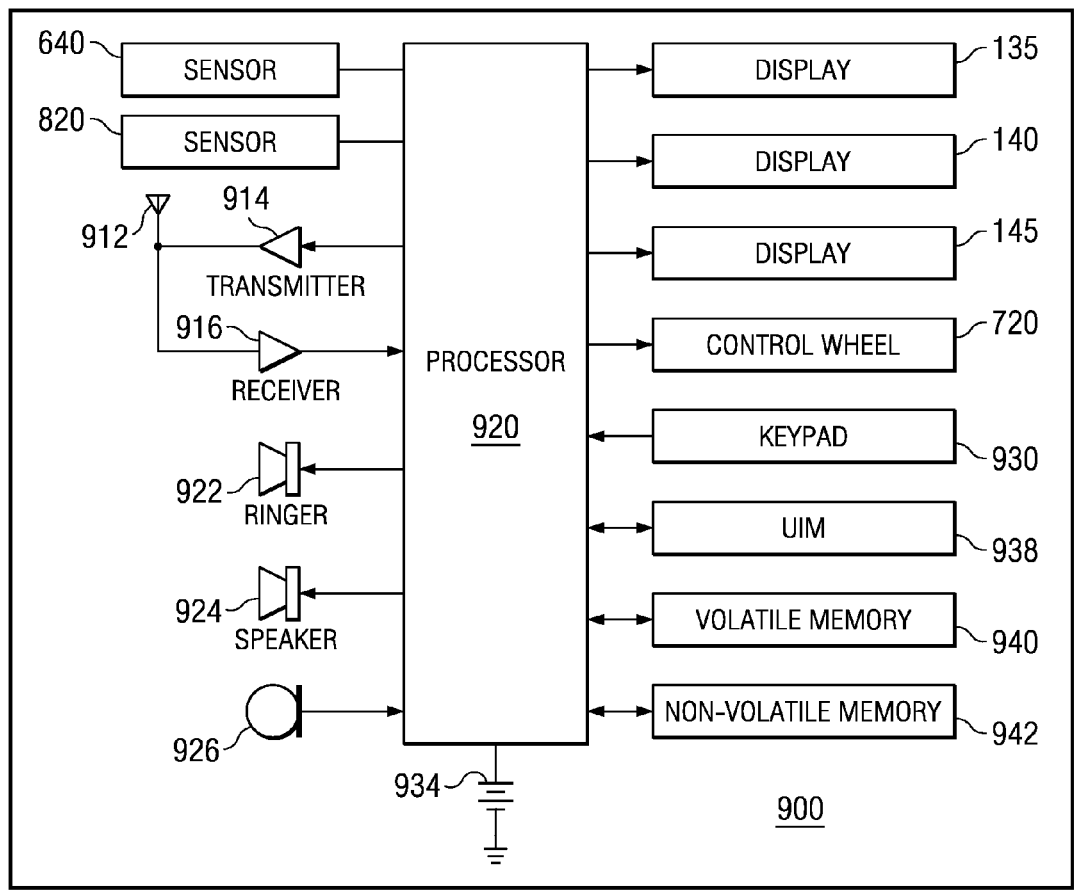
FIG. 9 is a block diagram of the apparatus of FIG. 7A according to an example embodiment of the invention.

FIG. 9 is a block diagram of the apparatus 700 of FIG. 7A according to an example embodiment of the invention. In FIG. 9, apparatus 700 is an electronic device 900. Electronic device 900 comprises at least one antenna 912 in communication with a transmitter 914 and a receiver 916. The electronic device 900 comprises a processor 920 and/or one or more other processing components. The processor 920 provides at least one signal to the transmitter 914 and receives at least one signal from the receiver 916. Electronic device 900 also comprises a user interface that includes one or more input and/or output elements, such as a conventional earphone or speaker 924, a ringer 922, a microphone 926, a keypad 930, a display 135, a display 140, a display 145, control wheel 720 and/or the like. Input and output elements are coupled with processor 920. In an example embodiment, display 135, display 140 and/or display 145 may be a touch screen, liquid crystal display, and/or the like capable of displaying text and graphical information. In an example embodiment, display 135 may be located on top surface 127 of first housing 125 (FIG. 1A) and display 145 may be located on bottom surface 129 of first housing 125 (FIG. 1B). Further, display 140 may be located on top surface 133 of second housing 130 (FIG. 1B). In an example embodiment, the electronic device 900 further comprises a battery 934, such as a vibrating battery pack for powering various circuits to operate electronic device 900. Electronic device 900 further comprises a volatile memory 940 and a non-volatile memory 924 coupled with processor 920. Electronic device 900 further comprises sensor 640 as shown in apparatus 100 of FIG. 6 for determining whether assembly 700 is in an open configuration or a closed configuration and sensor 820 (FIG. 8) for detecting a magnitude and direction of a rotation of control wheel 720. Sensor 820 may be any sensor capable of detecting rotation of control wheel 720, including but not limited to a motion sensor, a light sensor and/or the like. FIG. 8 shows sensor 820 affixed to second housing 130 adjacent to control wheel 720, however, sensor 820 may be located anywhere on assembly 700 for an accurate determination of control wheel 720 rotational magnitude and direction.

In an example embodiment, when processor 920 determines from sensor 640 that assembly 700 is in closed configuration (FIG. 7A), rotation of control wheel 720 by a user may cause sensor 820 to send a signal to processor 920 and processor 920 may cause display 135 to be affected. The signal may indicate the rotational magnitude and direction of control wheel 720. When processor 920 determines from sensor 640 that assembly 700 is in an open configuration (FIG. 7B), rotation of control wheel 720 (FIG. 7) by a user may cause sensor 820 to send a signal to processor 920 and processor may cause display 145 and/or display 140 to be affected. A display may be affected, for example, by scrolling screen data in any magnitude or direction related to a user's rotation of control wheel 720 and/or by displaying information and/or the like.

Figure 10:
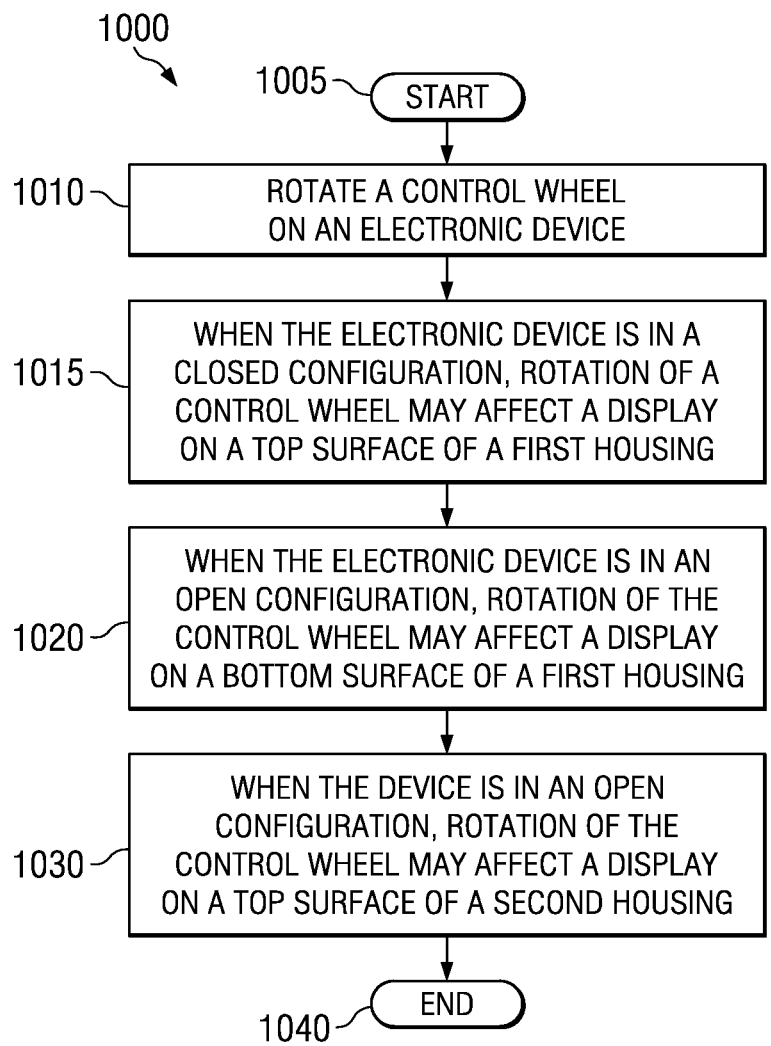
FIG. 10 is a flow diagram illustrating an example method for affecting at least one display of the apparatus of FIG. 7A according to an example embodiment of the invention.

FIG. 10 is a flow diagram illustrating an example method 1000 for affecting at least one display of the apparatus of FIG. 7A according to an example embodiment of the invention. At 1005, the method begins. At 1010, a control wheel 720 (FIGS. 7A, 7B, 8, 9) on electronic device 900 (FIG. 9) is rotated by a user. Control wheel 720 may be rotated by a user at any magnitude and in either direction. At 1015, when electronic device 900 is in closed configuration (FIG. 7A), rotation of control wheel 720 may affect a display on a top surface of a first housing, such as display 135 on first housing 125 (FIG. 8). At, 1020, when electronic device 900 is in an open configuration (FIG. 7B), rotation of control wheel 720 may affect a display on a bottom surface of a first housing, such as display 145 on first housing 129 as shown in apparatus 100 of FIG. 1B. At 1030, when the electronic device is in an open configuration such as open configuration (FIG. 7B), rotation of control wheel 720 may affect a display on a top surface of a second housing, such as display 140 on second housing 129 as shown in apparatus 100 of FIG. 1B. The method ends at 1040.

Without in any way limiting the scope, interpretation, or application of the claims appearing below, a technical effect of one or more of the example embodiments disclosed herein may be to provide an assembly to rotatably couple a first and second housing on an electronic device. Another technical effect of one or more of the example embodiments disclosed herein may be to allow a user to affect one or more displays on an electronic device based on whether an assembly is in a closed configuration or an open configuration.

Embodiments of the present invention may be implemented in software, hardware, application logic or a combination of software, hardware and application logic. The software, application logic and/or hardware may reside on volatile memory 940 or non-volatile memory 942. In an example embodiment, the application logic, software or an instruction set is maintained on any one of various conventional computer-readable media.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. An apparatus comprising:
an assembly adapted to rotatably couple a first housing and a second housing, said assembly adapted to rotate said first housing and said second housing with respect to each other between a closed configuration and at least one open configuration, said assembly comprising an inner ring coupled with said first housing and an outer ring coupled with said second housing, said inner ring being slidably coupled in a circumferential direction with said outer ring, said outer ring movable through a first opening in said first housing, said inner ring mov- able through a second opening in said second housing when said first housing and said second housing rotate with respect to each other.

2. An apparatus according to claim 1, wherein said inner ring comprises an external surface with at least one guide groove extending in said circumferential direction.

3. An apparatus according to claim 1, wherein said outer ring comprises an internal surface with at least one guide groove extending in said circumferential direction.

4. An apparatus according to claim 1, further comprising a lubricant disposed between an external surface of said inner ring and an internal surface of said outer ring.

5. An apparatus according to claim 1, further comprising a wiring harness located between said inner ring and said outer ring coupling at least two electronic components.

6. An apparatus according to claim 1, further comprising a stopping mechanism configured to restrict said first housing and said second housing from opening beyond a desired angle.

7. An apparatus according to claim 1, further comprising at least one magnetic element adapted to bias said first housing and said second housing in said at least one open configuration.

8. An apparatus according to claim 1, further comprising at least one magnetic element adapted to bias said first housing and said second housing in said closed configuration.

9. An apparatus according to claim 1, further comprising a first sensor configured to detect said assembly in at least one of said at least one open configuration and said closed configuration.

10. An apparatus according to claim 1, further comprising a control wheel slidably coupled with said outer ring in a circumferential direction, said control wheel rotatable around said exterior surface of said outer ring, and said control wheel rotatable through said first opening in said first housing and said second opening in said second housing.

11. An apparatus according to claim 10, wherein said control wheel being rotatable 360 degrees with respect to said outer ring.

12. An apparatus according to claim 10, wherein said control wheel being rotatable by a user without causing rotation of said outer ring.

13. An apparatus according to claim 10, wherein said control wheel being biasable in at least one position when rotated by a user.

14. An apparatus according to claim 10, further comprising a second sensor being configured to detect rotation of said control wheel.

15. An apparatus according to claim 10, further comprising a lubricant disposed between said outer ring and said control wheel.

16. An apparatus according to claim 10, further comprising at least one magnetic element adapted to bias said control wheel in at least one position when rotated by a user.

17. An apparatus according to claim 10, further comprising a display located on a top surface of said first housing wherein causing rotation of said control wheel affects said display when said apparatus is in said closed configuration.

18. An apparatus according to claim 10, further comprising a display located on a bottom surface of said first housing or on a top surface of said second housing, wherein causing rotation of said control wheel affects said display when said apparatus is in said at least one open configuration.

19. A device, comprising:
at least one electronic display connected to at least one of the first and second housings of the apparatus of claim 1;
at least one processor connected to the at least one electronic display;
at least one memory connected to the at least one processor;
a transmitter connected to the at least one processor; and
a receiver connected to the at least one processor.

* * * * *